(12) United States Patent
Chou et al.

(10) Patent No.: US 6,309,284 B1
(45) Date of Patent: Oct. 30, 2001

(54) MASS PRODUCTION POLISHER

(75) Inventors: Shih-Chen Chou, Miaoli; Wei-Jia Hsu, Taoyuan Hsien; Samuel I-En Lin, Chu-Nan; Win-Yann Jang, Taichung, all of (TW)

(73) Assignee: Uconn Technology Inc. (TW)

( * ) Notice: Subject to any disclaimer, the term of this patent is extended or adjusted under 35 U.S.C. 154(b) by 0 days.

(21) Appl. No.: 09/434,458

(22) Filed: Nov. 5, 1999

(30) Foreign Application Priority Data

Apr. 13, 1999 (TW) .............................. 88205656 U (51) Int. Cl.$^7$ ........................................ B24B 7/00
(52) U.S. Cl. ........................ 451/65; 451/271; 451/278
(58) Field of Search .......................... 451/65, 41, 271, 451/278, 285, 287, 288

(56) References Cited

U.S. PATENT DOCUMENTS

| | | | |
|---|---|---|---|
| 4,693,035 | * | 9/1987 | Doyle ........................................ 51/125 |
| 4,918,869 | * | 4/1990 | Kitta ........................................ 51/131.1 |
| 4,979,334 | * | 12/1990 | Takahashi ................................ 51/120 |
| 5,216,846 | * | 6/1993 | Takahashi ................................ 51/326 |
| 5,345,323 | * | 9/1994 | Basavanhally et al. ............... 385/59 |
| 5,351,445 | * | 10/1994 | Takahashi .............................. 451/271 |
| 5,516,328 | * | 5/1996 | Kawada ................................ 451/259 |
| 5,547,418 | * | 8/1996 | Takahashi ............................. 451/278 |
| 5,961,380 | * | 10/1999 | Togawa et al. ....................... 451/339 |
| 6,077,154 | * | 6/2000 | Takashi et al. ....................... 451/271 |
| 6,102,785 | * | 8/2000 | Chandler et al. .................... 451/271 |
| 6,106,369 | * | 8/2000 | Konihsi et al. ........................ 451/41 |
| 6,165,055 | * | 12/2000 | Takahasi et al. .................... 451/278 |

\* cited by examiner

*Primary Examiner*—Eileen P. Morgan
*Assistant Examiner*—Hadi Shakeri
(74) *Attorney, Agent, or Firm*—Michael D. Bednarek; Shaw Pittman LLP (57) ABSTRACT

A mass production polisher includes a polisher base, a polishing element, a rotary arm, a fixture, a force-cushioning means and a force-applying means. The polishing element is provided in the polisher base. The rotary arm is rotatably provided on the polisher base. The fixture is connected to the rotary arm for holding at least one object. The force-cushioning means is provided on the rotary arm. The force-applying means is also provided on the rotary arm for applying force through the force-cushioning means to the fixture so that the object pushes against the polishing element.

6 Claims, 8 Drawing Sheets

MASS PRODUCTION POLISHER

BACKGROUND OF THE INVENTION

1. Field of the Invention

The present invention relates to a mass production polisher for polishing end surfaces of semi-products of jumpers, and in particular to a mass production polisher that can apply a steady friction between the end surfaces of the semi-products of the jumpers and the mass production polisher during the polishing.

2. Description of Prior Art

Optical fiber jumpers are widely used in the field of optical communications. An optical fiber jumper includes an optical fiber and two connectors coupled to each end of the optical fiber so as to allow connection to, for example, another jumper. The end surfaces of the jumper are polished into a substantially convex shape in order to minimize the optical loss of transmission when two optical fiber jumpers are connected together.

Figure 1A:
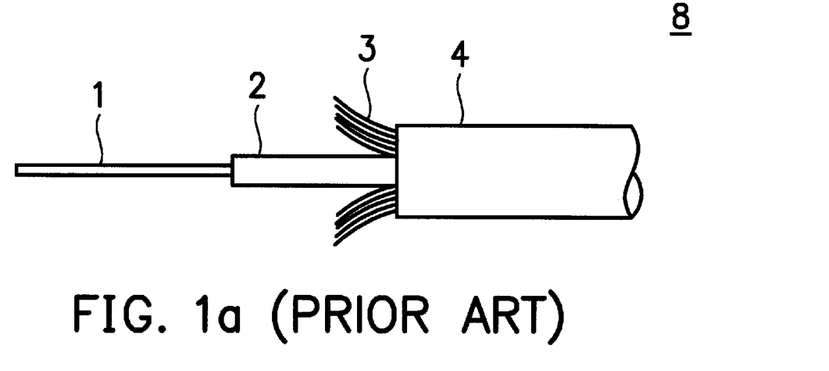
FIG. 1a is a schematic diagram of an optical fiber.

As shown in FIG. 1a, an optical fiber 8 includes, from out to in, a plastic outer cover 4, celvar 3, a resin layer 2 and a core 1.

Figure 1B:
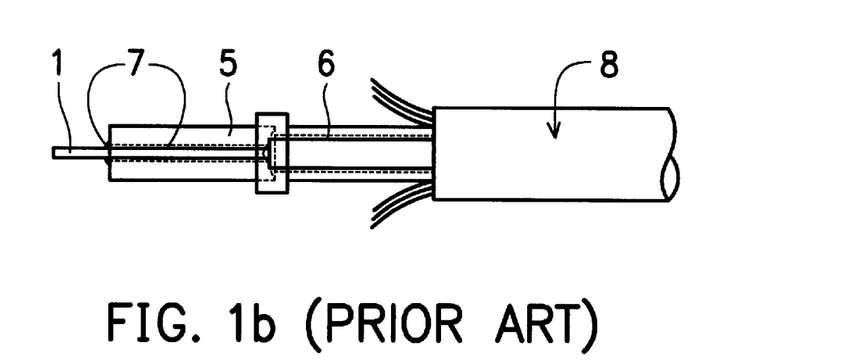
FIG. 1b depicts an insertion of a core into a ferrule.
Figure 1C:
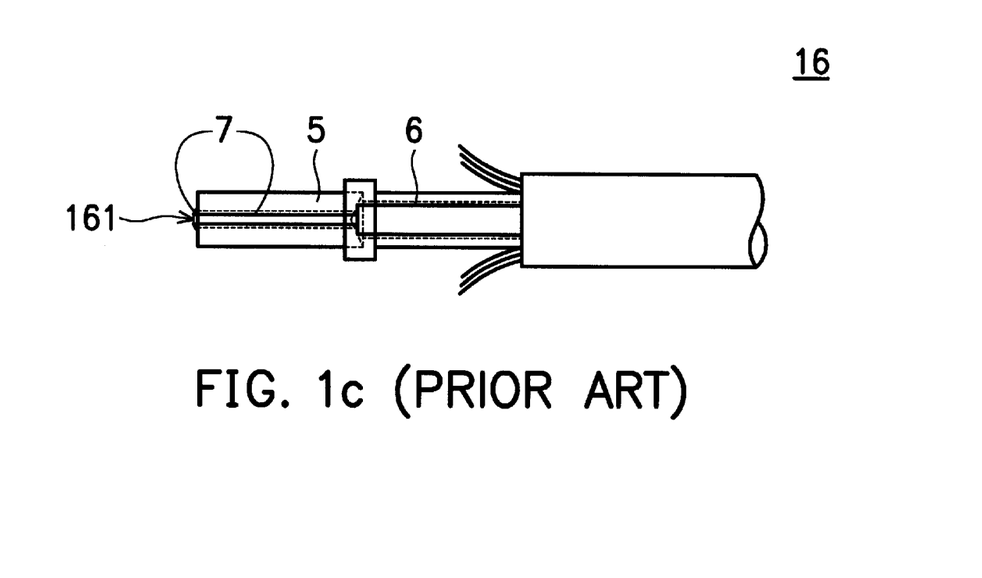
FIG. 1c depicts a semi-product of a jumper.

How a jumper is produced is described now. As shown in FIG. 1b, a ferrule 5 has a through hole 6 in which AB glue 7 is applied. The core 1 of the optical fiber 8 is inserted into the through hole 6 of the ferrule 5. It is noted that the core 1 of the optical fiber 8 sticks out from the ferrule 5. Then, the sticking-out portion of the core 1 is cut away, as shown in FIG. 1c, as a semi-product of the jumper indicated by reference number 16. Also, reference number 161 represents an end surface of the remaining core 1, which is then polished by a polisher as shown in FIG. 2, so as to become substantially convex.

Figure 2:
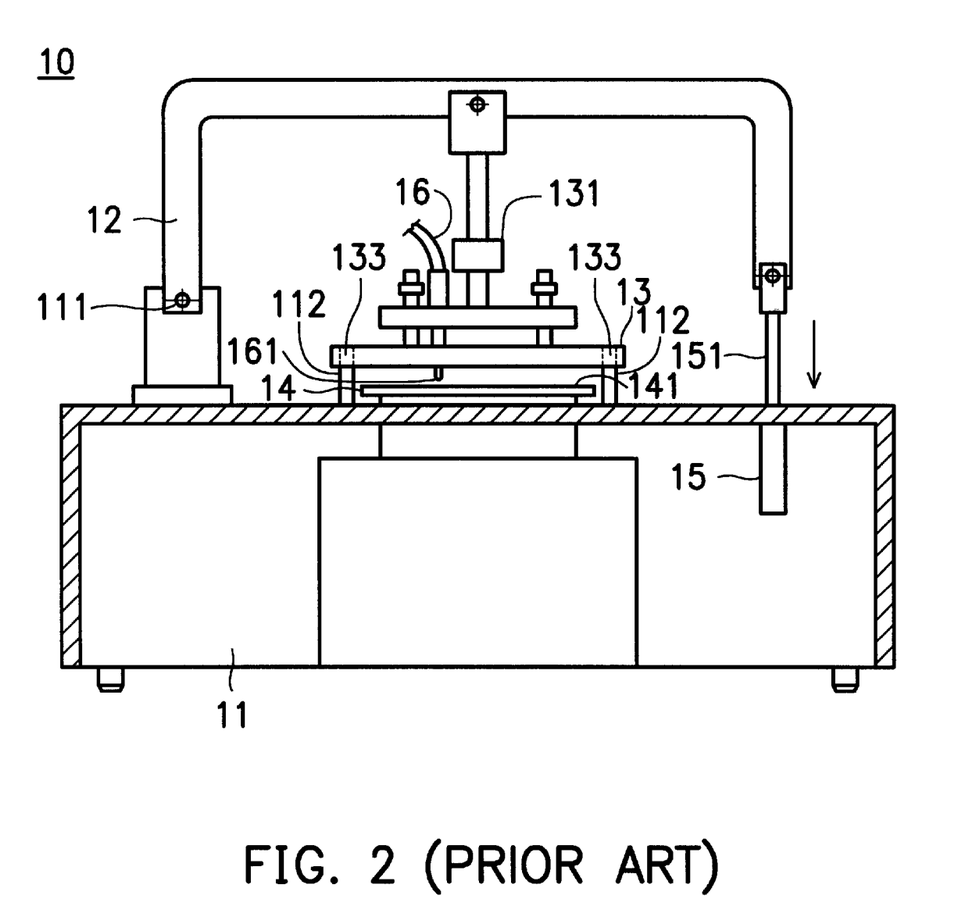
FIG. 2 is a schematic diagram of a conventional polisher.

Now referring to FIG. 2, a conventional polisher 10 includes a polisher base 11 on which a rotary arm 12 is provided by means of a pivot 111 so that the rotary arm 12 can rotate with respect to the pivot 111. A fixture 13 is provided on the polisher base 11 for holding the semi-product 16 shown in FIG. 1c. The fixture 13 includes a flexible connector 131 which can connect to the middle part of the rotary arm 12. Also, the fixture 13 includes four holes 133 provided on the corners of the fixture 13 to connect coupling bars 112 provided on the polisher base 11. A cylinder 15 is provided inside the polisher base 11 for applying a pulling force to the rotary arm 12 via a connecting rod 151 in the direction indicated by an arrow shown in FIG. 2. Thus, during the polishing process, the end surface 161 of the semi-product 16 is forced against the surface 141 of a polishing element 14.

Figure 3:
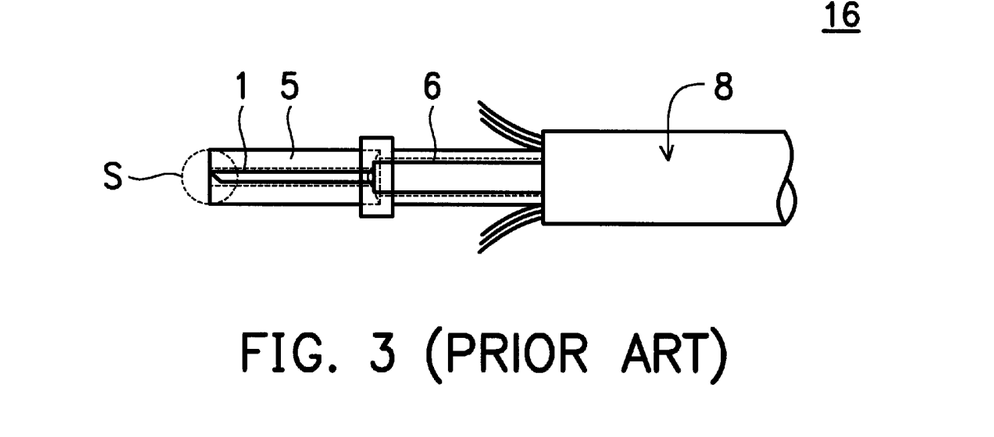
FIG. 3 is a schematic diagram showing an optical fiber jumper after being polished by the conventional polisher.

However, the conventional polisher 10 has some defects:

(1) Before being polished, the semi-product 16 is subjected to a downward force by the cylinder 15 so as to push against the polishing surface 141. Hence, the core 1 of the semi-product 16 is easily torn up due to the sudden increase in frictional forces between the semi-product 16 and the polishing surface 141 at the beginning of polishing. The resultant end surface of the core 1 is shown in FIG. 3, circled by reference symbol "S".

Figure 4:
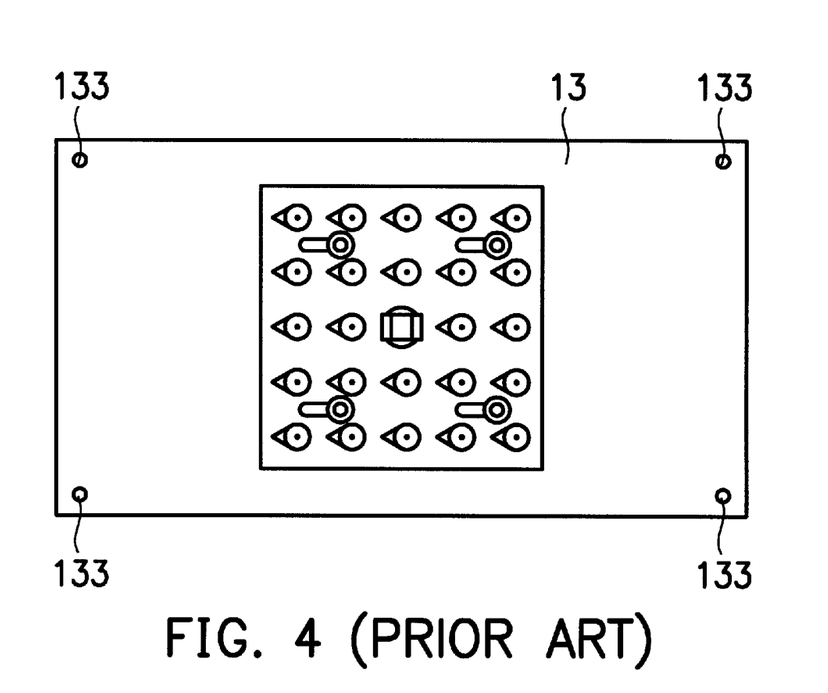
FIG. 4 is a top view of a fixture of the conventional polisher.

(2) As shown in FIG. 4, the fixture 13 is substantially a rectangular in shape; therefore, the subjected stresses of four holes 133, provided at four corners of the fixture 13 to connect the fixture 13 with the coupling bars 112 of the polisher base 11, are unbalanced. As a result, the semi-product of the jumper 16 as shown in FIG. 1c, held by the fixture 13, is easily subjected to an uneven polishing force by the polishing element 14 during the polishing.

(3) Because the pulling force applied by the cylinder 15 is through the connection between one end of the rotary arm 12 and the connecting rod 151, the fixture 13 connected to the middle part of the rotary arm 12 can not remain balanced after the polishing. As a result, the fixture 13 needs to be readjusted again every time the polishing begins. This leads to the additional problem that the operation time is increased.

(4) There is no waterproof device provided on the polisher base 11; therefore, the liquid used during the polishing may easily sputter to operators and surrounding equipment.

SUMMARY OF THE INVENTION

The object of the present invention is to solve the above-mentioned problems and provide a mass production polisher that can apply a steady friction between the end surfaces of semi-products of the jumpers and the mass production polisher during the polishing.

The mass production polisher can simultaneously polish the end surface of each of a plurality of optical fibers protruding from ferrules which the optical fibers are inserted into. The mass production polisher comprises a polisher base, a polishing element, a rotary arm, a fixture, a force-applying means and at least one force-cushioning means. The polishing element is provided inside the polisher base. The rotary arm is provided on the polisher base in a rotatable manner. The fixture is located above the polishing element and connected with the rotary arm for holding the ferrules in such a manner that the end surface of each of the optical fibers protrudes from the fixture and abuts against the polishing element. The force-applying means is provided on the rotary arm for applying variable forces to the fixture in a controlled manner. The force-cushioning means are provided on the rotary arm for providing the force-applying means a cushioning effect when the force-applying means is applying force to the fixture.

Specifically, the mass production polisher further comprises a first joint, a pressure plate and a slide bar. The first joint is associated with the force-applying means. The pressure plate, associated with the first joint, is abutted against the force-cushioning means when the force-applying means is applying force to the fixture. The slide bar is associated with the pressure plate.

Specifically, the fixture is substantially a square and comprises a base plate, an adjusting plate, a second joint, at least one adjustable bolt, four holes, at least one through hole and at least one lead hole. The adjusting plate is provided on the base plate in such a manner that the adjusting plate can move along a first direction to be near or far from the base plate within a first predetermined range and a second direction perpendicular to the first direction within a second predetermined range. The second joint, penetrating through the adjusting plate, is provided on the base plate. Adjustable bolts for adjusting the distance between the base plate and the adjusting plate are provided on the base plate and penetrate through the adjusting plate. The holes are provided on the base plate in order to connect the fixture to the polisher base. The through holes are provided on the base plate, and the lead holes, corresponding respectively to the through holes, are provided on the adjusting plate.

Specifically, the mass production polisher further comprises two fixed plates, a control panel, a polishing pad, two locating pins, a set pin and a waterproof wall. The fixed plates are provided on the rotary arm; thereby, each of the force-cushioning means is provided on the fixed plates, respectively. The control panel is provided on the polisher base. The polishing pad, for contacting the end surface of each of the optical fibers, is disposed on the polishing element. The locating pins are provided on the polisher base for locating the rotary arm. The set pin is attached to the rotary arm for connecting the fixture to the rotary arm. The waterproof wall is provided on the polisher base.

Specifically, the force-cushioning means is an oil cylinder, and the force-applying means is a low-friction cylinder.

BRIEF DESCRIPTION OF THE DRAWINGS

The objects, features and advantages of the present invention can be more fully understood by reading the subsequent detailed description and examples with reference made to the accompanying drawings, wherein.

DETAILED DESCRIPTION OF THE PREFERRED EMBODIMENT

A mass production polisher of the present invention is described as follows with reference to the drawings.

Figure 5A:
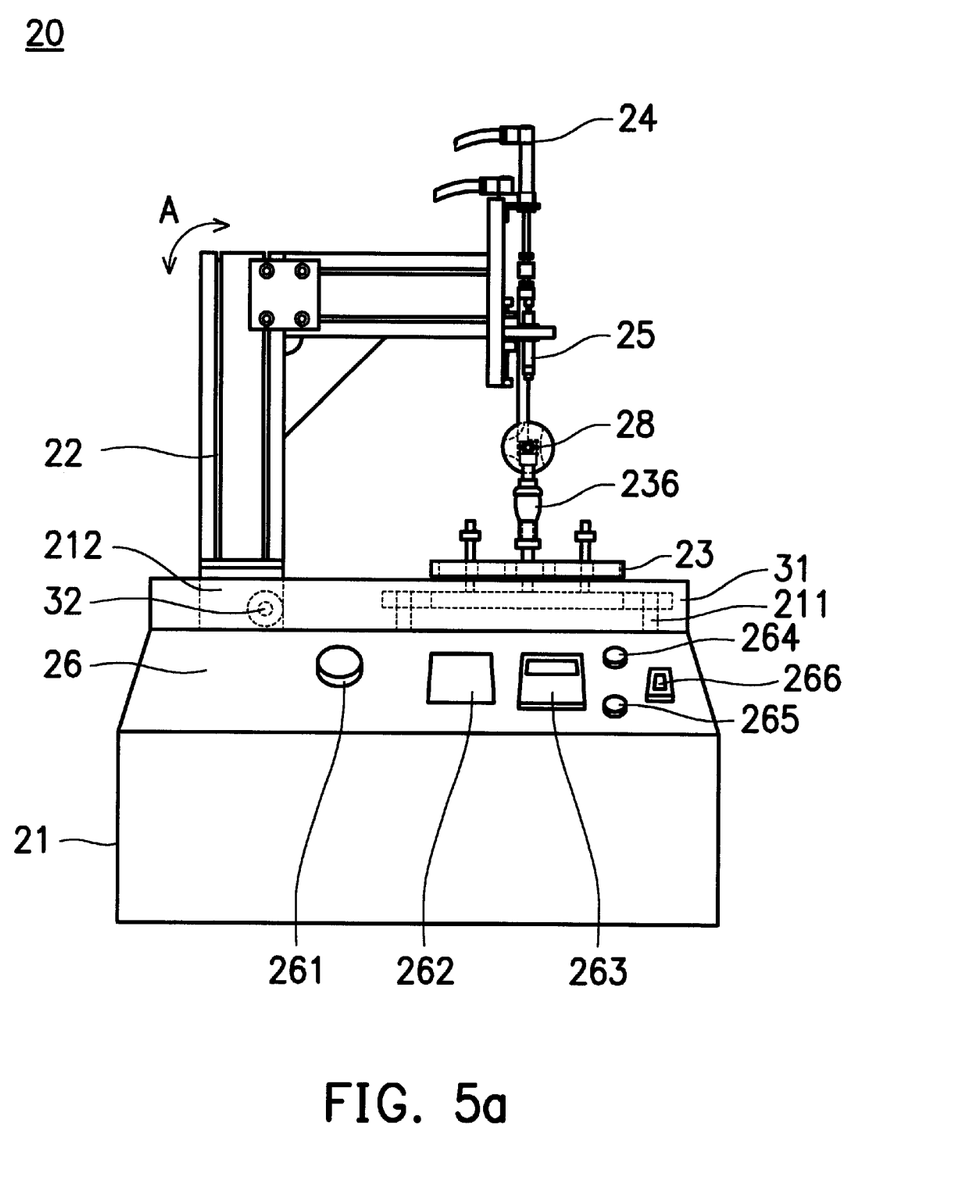
FIG. 5a is a side view of a mass production polisher of the present invention, wherein a fixture is disposed on a polisher base.

Referring to FIG. 5a, a mass production polisher 20 of the present invention includes a polisher base 21. An L-shaped rotary arm 22 is rotatably provided on the polisher base 21 via a rotary-arm support 212. That is, the rotary arm 22 can rotate in the directions indicated by arrows A. Furthermore, a pin hole 28 is provided at the free end of the rotary arm 22. A force-applying means 24 (for example, a low-friction cylinder) is provided on the rotary arm 22 in order to apply variable forces to the fixture 23 disposed on the polisher base 21. Two force-cushioning means 25 (for example, oil cylinders) are also provided on the rotary arm 22 in order to provide the force-applying means 24 a cushioning effect when the force applying means 24 is applying force to the fixture 23. A control panel 26 is provided on the polisher base 21, and two locating pins 32 are provided at the rotary-arm support 212 of the polisher base 21 in order to locate the rotary arm 22 relative to the rotary-arm support 212. In FIG. 5a, only one locating pin 32 is shown.

Furthermore, the control panel 26 comprises a pressure-adjusting button 261 for adjusting the external pressure applied to the force-applying means 24, a pressure gauge 262 for showing the pressure applied by the force-applying means 24, a timer 263 for controlling the polishing time, a start button 264 for starting the operation of the mass production polisher 20, a stop button 265 for stopping the operation of the mass production polisher 20 and a pressure button 266 for determining whether the pressure is being applied or not.

Figure 5B:
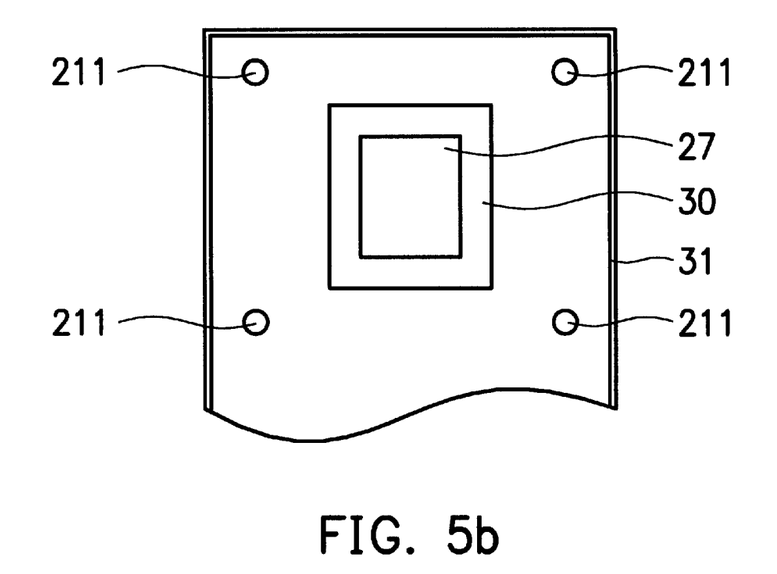
FIG. 5b is a partial top view inside a waterproof wall of the mass production polisher of the present invention.

Referring to FIG. 5b, the mass production polisher 20 further comprises a polishing element 30, a waterproof wall 31 and four coupling bars 211. The polishing element 30 is provided inside the polisher base 21. The polishing element 30 is covered by a polishing pad 27. In the polishing process, a polishing sheet (not shown) is disposed on the polishing pad 27 to contact with the end surface 161 of the semi-product 16 shown in FIG. 1c. Some liquid, such as polishing slurry or water, is added onto the polishing sheet for facilitating the polishing. Then, the polishing element 30 moves in a predetermined manner to perform the polishing. The waterproof wall 31 is provided on the polisher base 21 in order to prevent the liquid used during the polishing process from splashing the worker or other equipment. Furthermore, the coupling bars 211 are provided on the polisher base 21 in order to firmly fix the fixture 23 relative to the polisher base 21.

Figure 5C:
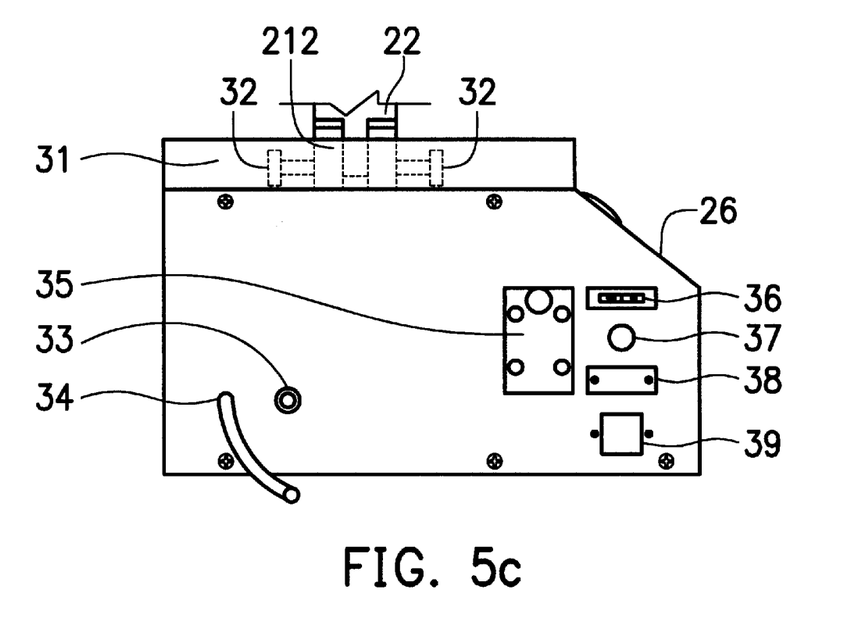
FIG. 5c is a partial rear view of the mass production polisher of the present invention.

Referring to FIG. 5c, numeral 33 represents a pressure connector for connecting an external pressure source (not shown) to provide a pressure to the force-applying means 24. Numeral 34 represents a water hose for discharging the liquid used during the polishing process. Numeral 35 represents a supporting stand. Numeral 36 represents an electric switch. Numeral 37 represents a fuse. Numeral 39 represents a plug. Numeral 38 represents a selector switch for the operator to select the voltage used (110V or 220V).

Figure 6A:
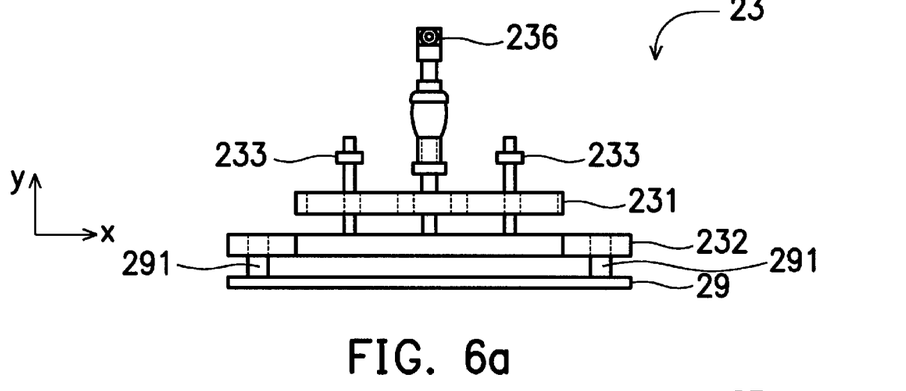
FIG. 6a is a front view of the fixture of the present invention, wherein the fixture is disposed on a fixture support.
Figure 6B:
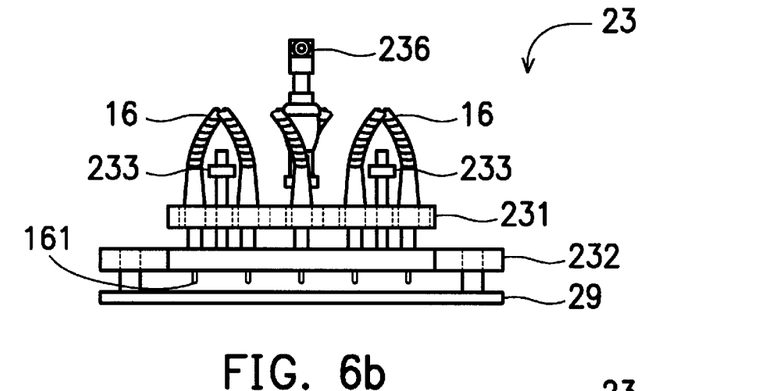
FIG. 6b is a front view of the fixture disposed on the fixture support, wherein semi-products of optical fiber jumpers are inserted into the fixture.

The fixture 23 of the present invention is now described in detail with reference to FIGS. 6a, 6b and 6c. Numeral 29 represents a fixture support for supporting the fixture 23 when the fixture 23 is not in use. The fixture support 29 includes four locating bars 291. The fixture 23 is substantially square and has a base plate 232 and an adjusting plate 231. The adjusting plate 231 is provided on the base plate 232 in such a manner that the adjusting plate 231 can move in a Y (first) direction to be near or far from the base plate 232 within a first predetermined range and an X (second) direction perpendicular to the Y direction within a second predetermined range. In addition, the second predetermined range is defined by bolt holes 238, and the first predetermined range is defined by adjustable bolts 233. The second joint 236 for guiding the direction of the downward pressure from the force-applying means 24, penetrating through the adjusting plate 231, is provided on the base plate 232. Four adjustable bolts 233, penetrating through bolt holes 238 of the adjusting plate 231, are provided on the base plate 232 in order to adjust the distance between the base plate 232 and the adjusting plate 231 when the semi-product of the jumper 16 shown in FIG. 1c is inserted into the fixture 23. The bolt holes 238 are provided in the adjusting plate 231 to leave some moving space for the adjustable bolts 233. Four holes 235 are provided at four corners of the base plate 232 for receiving the locating bar 291 when the fixture 23 is disposed on the fixture support 29, or receiving the coupling bar 211 when the fixture 23 is disposed on the polisher base 21.

Figure 6C:
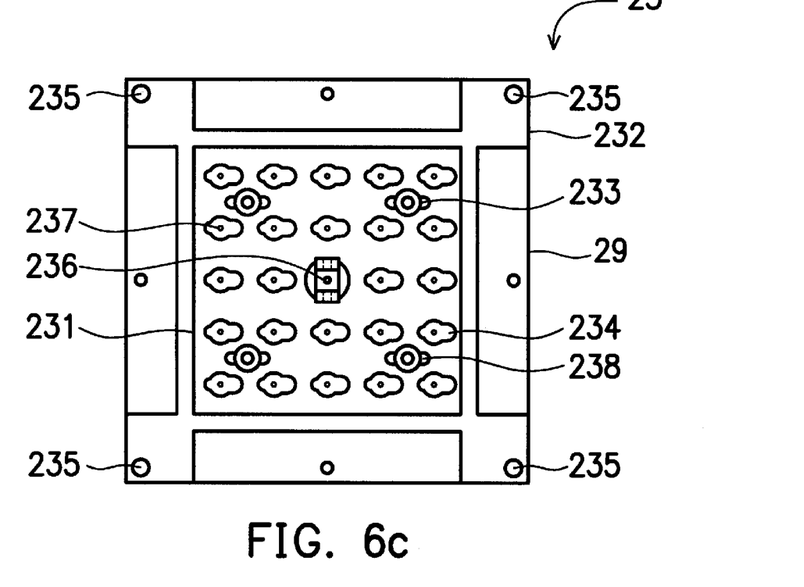
FIG. 6c is a top view of the fixture disposed on the fixture support.

A plurality of lead holes 234 are provided on the adjusting plate 231, and the shape of each of the lead holes 234 is shown in FIG. 6c. Specifically, the size of the left, half circle of the lead hole 234 is different from the size of the right, half circle of the lead hole 234. Therefore, different kinds of the semi-products of jumpers can be inserted into the lead holes 234. When the semi-product is provided with an ST-type connector, the adjusting plate 231 is moved toward the right so that the semi-product is contained in the left half circle of the lead hole 234. In contrast, when the semi-product is provided with an SC-type (or FC-type) connector, the adjusting plate 231 is moved toward the left so that the semi-product is contained in the right half circle of the lead hole 234.

A plurality of through holes 237, corresponding to the lead holes 234, are provided on the base plate 232. Thus, the end surfaces 161 of the semi-products 16 protrude from the base plate 232 with a predetermined length. That is, the end surface 161 of the semi-product 16 can be abutted against the polishing sheet disposed on the polishing pad 27 during the polishing process.

Figure 7A:
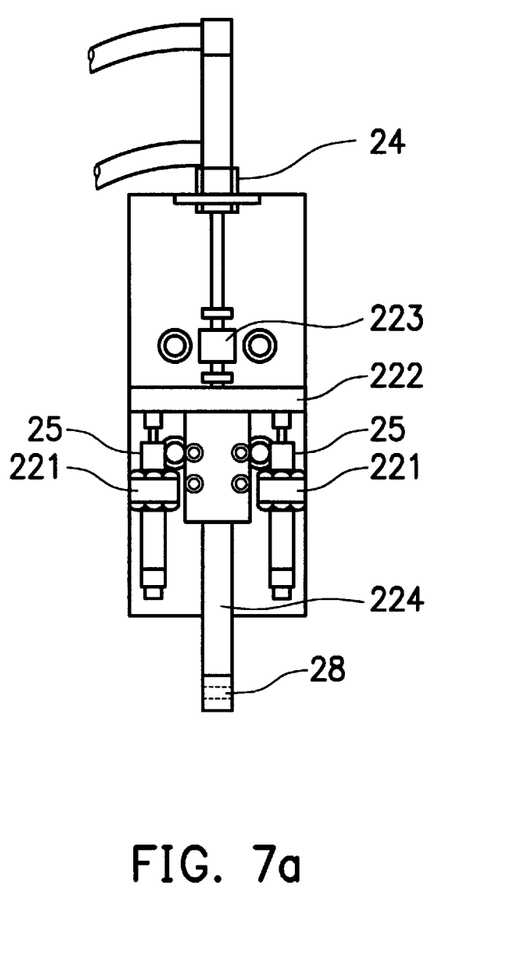
FIG. 7a is a front view of the structure around a force-applying means and force-cushioning means of the present invention.
Figure 7B:
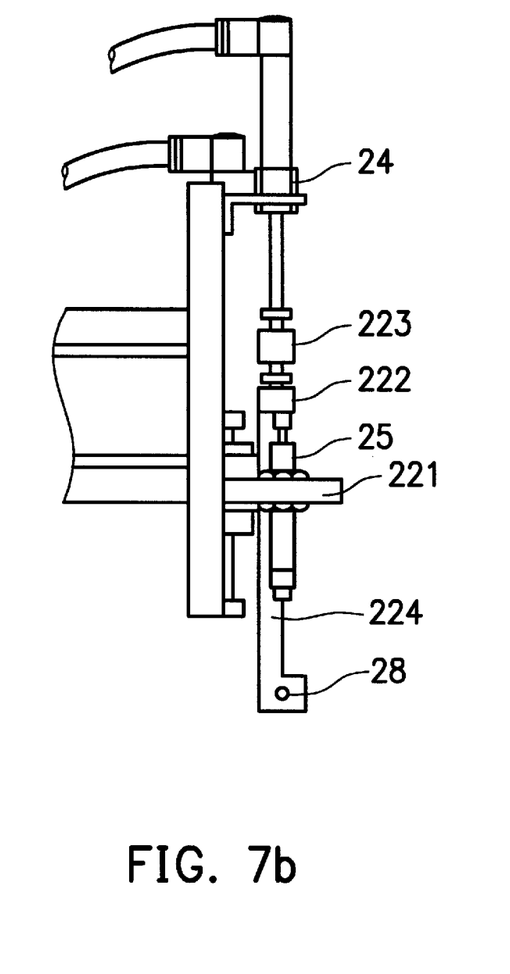
FIG. 7b is a side view of the structure around a force applying means and force-cushioning means of the present invention.

Now referring to FIG. 7a and FIG. 7b, the situation in which the force-applying means 24 applies external force to the fixture 23 is described in detail. First, the structure around the force-applying means 24 and the force-cushioning means 25 is described. Two fixed plates 221 are provided on the rotary arm 22, while the force-cushioning means 25 are provided on the fixed plates 221. A slide bar 224 is associated with a pressure plate 222 to move upward and downward. A first joint 223 for guiding the direction of the downward pressure from the force-applying means 24, provided on the pressure plate 222, is associated with the force-applying means 24. The pressure plate 222 is abutted against the force-cushioning means 25 when the force-applying means 24 applies force to the fixture 23.

Second, the process by which the force-applying means 24 applies external force to the fixture 23 is described in detail. At the beginning, the user adjusts the pressure to be applied by means of the pressure button 261 of the control panel 26. Then, the force-applying means 24 applies a predetermined pressure based on the signal from the control panel 26 to the pressure plate 222 through the first joint 223. After the pressure plate 222 has been subjected to a predetermined pressure, it moves downward together with the slide bar 224. Accordingly, the downward movement of the slide bar 224 results in the occurrence of the downward pressure of the base plate 232 of the fixture 23. In addition, when the pressure plate 222 is in contact with the force-cushioning means 25 during the downward movement, it is subjected to a cushion effect. As a result, the pressure applied by the pressure plate 222 is relieved, and the friction between the end surface 161 of the semi-product 16 disposed in the fixture 23 and the polishing sheet disposed on the polishing pad 27 is increased gradually.

Figure 8:
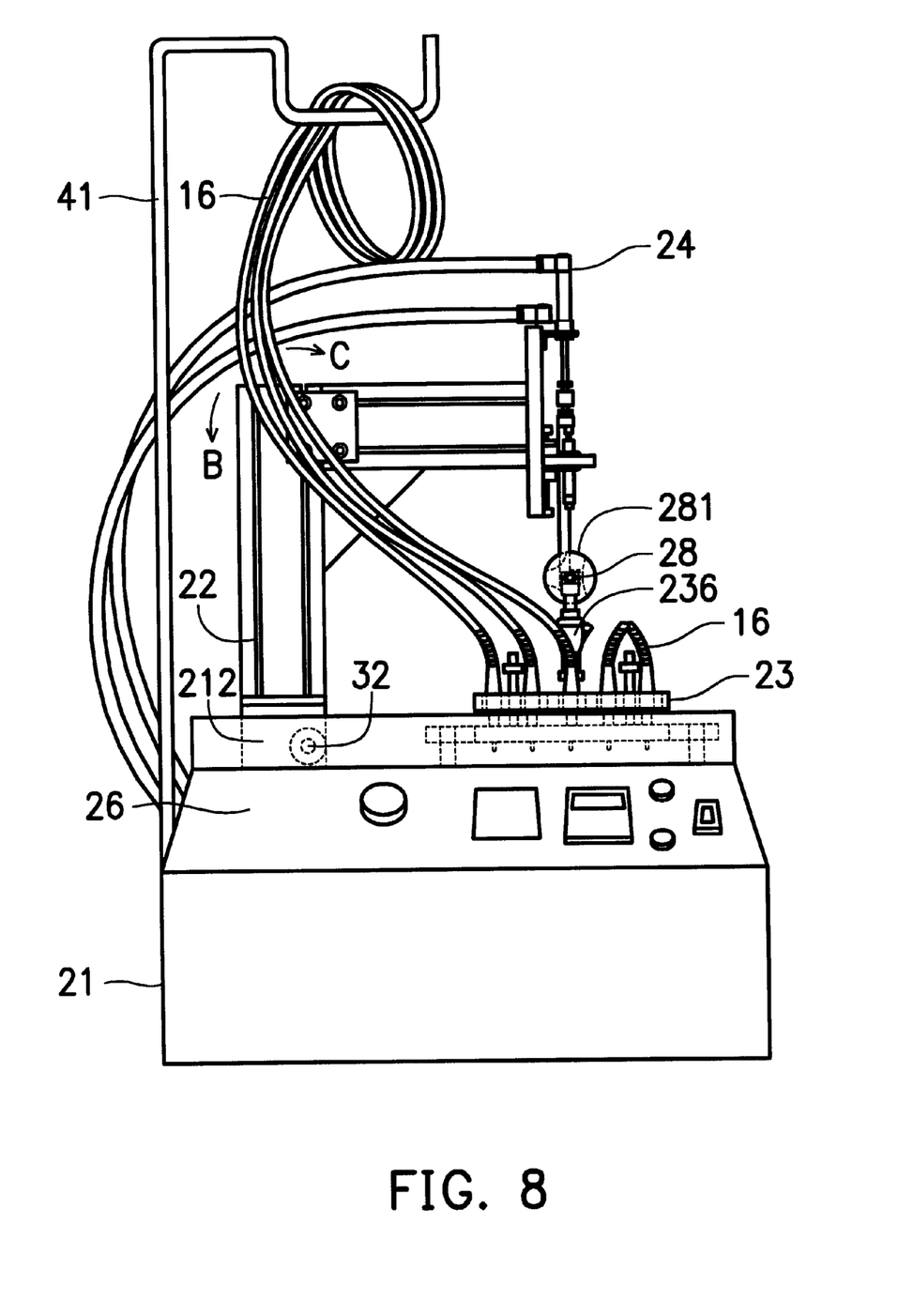
FIG. 8 is a side view of a mass production polisher of the present invention, wherein the semi-products of optical fiber jumpers are inserted into the fixture.

FIG. 8 shows a side view of the mass production polisher, wherein a plurality of semi-products 16 shown in FIG. 1c are inserted into the fixture 23. A support bracket 41 is disposed on the supporting stand 35. Then, the rear portions of the semi-products 16 can be hung in the support bracket 41 in order to prevent the rear portions of the semi-products 16 from interfering with the polishing. Numeral 281 represents a set pin 281 attached to the rotary arm 22. The set pin 281 is inserted into the pin hole 28 so as to connect the second joint 236 of the fixture 23 and the slide bar 224.

Only three rear portions of the semi-products are shown in FIG. 8; others are omitted.

The structure of the mass production polisher is described above; the following is the description of one embodiment of the polishing process of the mass production polisher:

(1) determining the voltage used (110V or 220V) based on the environmental condition by means of the selector switch 38;

(2) connecting the pressure connector 35 to an external pressure source of 0.5 kgf/cm$^2$;

(3) inserting twenty-four semi-products 16 of jumpers into the fixture 23;

(4) moving the adjusting plate 231 to contain the semi-products 16 in the lead holes 234;

(5) fixing the adjusting plate 231 and the base plate 232 together by the adjustable bolts 233;

(6) disposing the polishing pad 27 on the polishing element 30, disposing a first polishing sheet on the polishing pad 27 and adding the polishing liquid on the first polishing sheet;

(7) mounting the fixture 23 on the polisher base 21 by way of inserting the coupling bars 211 into the holes 235, and inserting the set pin 281 into the pin hole 28 so as to connect the second joint 236 and the slide bar 224;

(8) adjusting the pressure gauge 262 and the timer 263, then pushing the start button 264 to perform a first polishing process (During the polishing process, the force-applying means 24 applies the pressure, based on the pressure gauge 262, to the fixture 23 while the end surfaces 161 of the semiproducts 16, disposed on the fixture 23, are abutted against the polishing sheet disposed on the polishing element 30, which move in a predetermined manner).;

(9) rotating the rotary arm 22 together with the fixture 23 in direction B shown in FIG. 8 and cleaning the end surfaces of the semi-products by means of an electrostatic dryer, after the first polishing process is finished;

(10) removing the first polishing sheet from the polishing pad 27, and then putting a second polishing sheet on the polishing pad 27;

(11) rotating the rotary arm 22 in direction C shown in FIG. 8, and remounting the fixture 23 on the polisher base 21 by inserting the coupling bars 211 into the holes 235;

(12) adjusting the pressure gauge 262 and the timer 263, and then pressing the start button 264 to perform a second polishing process;

(13) after the second polishing process is finished, rotating the rotary arm 22 together with the fixture 23 in direction B shown in FIG. 8 and cleaning the end surfaces of the semi-products by means of sprays of water, then drying the end surfaces of the semi-products by means of the electrostatic dryer;

(14) removing the second polishing sheet from the polishing pad 27, and then putting a third polishing sheet on the polishing pad 27;

(15) rotating the rotary arm 22 in direction C shown in FIG. 8, and remounting the fixture 23 on the polisher base 21;

(16) adjusting the pressure gauge 262 and the timer 263, and then pressing the start button 264 to perform a third polishing process;

(17) after the third polishing process is finished, rotating the rotary arm 22 together with the fixture 23 in direction B and cleaning the end surface of each of the semi-products by means of sprays of water and then drying the end surfaces of the semi-products by means of the electrostatic dryer;

(18) removing the third polishing sheet from the polishing pad 27, and then putting a fourth polishing sheet on the polishing pad 27;

(19) rotating the rotary arm 22 in direction C shown in FIG. 8, and remounting the fixture 23 on the polisher base 21;

(20) adjusting the pressure gauge 262 and the timer 263, and then pressing the start button 264 to perform a fourth polishing process;

(21) after the fourth polishing process is finished, rotating the rotary arm 22 together with the fixture 23 in direction B shown in FIG. 8 and cleaning the end surfaces of the semi-products by means of sprays of water, and then drying the end surfaces of the semi-products by means of the electrostatic dryer;

(22) removing the fourth polishing sheet from the polishing pad 27, and then putting a fifth polishing sheet on the polishing pad 27;

(23) rotating the rotary arm 22 in direction C, and mounting the fixture 23 on the polisher base 21;

(24) adjusting the pressure gauge 262 and the timer 263, and then pressing the start button 264 to perform a fifth polishing process;

(25) after the fifth polishing process is finished, removing the fixture 23 from the polisher base 21 and putting the fixture 23 on the fixture base 29; and (26) cleaning the end surfaces of the semi-products by means of sprays of water and drying the end surfaces of the semi-products by means of the electrostatic dryer, and then taking the semi-products out of the fixture 23.

It is understood that the polishing times and the applying pressures mentioned in the above steps are all adjustable. Increasing the applied pressure of the force-applying means and shortening the polishing time is not a problem if the resultant polishing quality of the jumpers is sufficient. Also, when the whole polishing process is performed without any external pressure, the polishing time of each of the polishing processes can be elongated.

To sum up, when the force-applying means of the present invention applies a pressure to the fixture, the force-applying means is subjected to a cushion effect due to the force-cushioning means. As a result, at the beginning of the polishing, the end surface 161 of the semi-product 16 is not subjected to a sudden friction. Tearing up the polished core can be avoided.

Furthermore, the fixture is substantially square; therefore, the subjected stresses of the four holes, provided at four corners of the fixture, are balanced when the fixture is subjected to the external force applied by the force-applying means. As a result, the semi-product held by the fixture is subjected to a uniform friction by the polishing element during the polishing.

Furthermore, the force-applying means is provided on the rotary arm, and it applies a uniform pressure to the fixture through the first joint and the force-cushioning means; because of this, the fixture connected to the rotary arm can remain balanced after the polishing. As a result, the fixture need not be readjusted again every time the polishing begins. Moreover, this could lead to another advantage that the operation time could be decreased.

Furthermore, a waterproof wall is provided on the polisher base; therefore, the liquid used during the polishing may not sputter to operators or surrounding equipment.

Although this invention has been described in its preferred embodiments, it is understood that the present disclosure of the preferred embodiments can be modified in the details of actualization. The scope of the invention should be determined by the appended claims and not by the specific examples given herein.

What is claimed is:

1. A mass production polisher for polishing at least one object, comprising:
   a polisher base;
   a polishing element provided in the polisher base;
   a rotary arm rotatably provided on the polisher base;
   a fixture connected to the rotary arm for holding the at least one object;
   at least one force-cushioning means provided on the rotary arm to cushion a downwardly force applied to the fixture before polishing said at least one object; and
   a force-applying means also provided on the rotary arm for applying the downwardly force through the at least one force-cushioning means to the fixture so that the at least one object pushes against the polishing element.

2. A mass production polisher as claimed in claim 1, further comprising:
   a first joint associated with the force-applying means;
   a pressure plate, associated with the first joint, abutted against the force-cushioning means when the force-applying means is applying force to the fixture; and
   a slide bar associated with the pressure plate.

3. A mass production polisher as claimed in claim 2, wherein the fixture is substantially square and comprises:
   a base plate;
   an adjusting plate provided on the base plate in such a manner that the adjusting plate moves along a first direction to be near or far from the base plate within a first predetermined range and a second direction perpendicular to the first direction within a second predetermined range;
   a second joint, penetrating through the adjusting plate, provided on the base plate;
   at least one adjustable bolt penetrating through the adjusting plate, provided on the base plate for adjusting the distance between the base plate and the adjusting plate;
   four holes provided on the base plate for connecting the fixture to the polisher base;
   at least one through hole provided on the base plate; and
   at least one lead hole, corresponding to the through hole, provided on the adjusting plate.

4. A mass production polisher as claimed in claim 3, further comprising:
   two fixed plates provided on the rotary arm, whereby a force-cushioning means is provided on each of the fixed plates respectively;
   a control panel provided on the polisher base;
   a polishing pad disposed on the polishing element for contracting the at least one object;
   two locating pins provided on the polisher base for locating the rotary arm;
   a set pin attached to the rotary arm for connecting the fixture to the rotary arm; and
   a waterproof wall provided on the polisher base.

5. A mass production polisher as claimed in claim 4, wherein the force-cushioning means is an oil cylinder.

6. A mass production polisher as claimed in claim 5, wherein the force-applying means is a low-friction cylinder.

* * * * *